United States Patent
Herberger et al.

(10) Patent No.: US 10,645,361 B2
(45) Date of Patent: May 5, 2020

(54) SYSTEM AND METHOD FOR REALTIME 360 DEGREE VIDEO PERSPECTIVE VIEW PATH DETERMINATION

(71) Applicant: BELLEVUE INVESTMENTS GMBH & CO. KGAA, Berlin (DE)

(72) Inventors: Tilman Herberger, Dresden (DE); Titus Tost, Dresden (DE)

(73) Assignee: BELLEVUE INVESTMENTS GMBH & CO. KGAA (DE)

( * ) Notice: Subject to any disclaimer, the term of this patent is extended or adjusted under 35 U.S.C. 154(b) by 228 days.

(21) Appl. No.: 15/818,955

(22) Filed: Nov. 21, 2017

(65) Prior Publication Data
US 2018/0176534 A1 Jun. 21, 2018

Related U.S. Application Data

(60) Provisional application No. 62/426,064, filed on Nov. 23, 2016.

(51) Int. Cl.
| | |
|---|---|
| *H04N 13/117* | (2018.01) |
| *G11B 27/031* | (2006.01) |
| *H04N 13/189* | (2018.01) |
| *H04N 13/356* | (2018.01) |
| *H04N 13/383* | (2018.01) |
| *G06F 3/01* | (2006.01) |
| *G02B 27/01* | (2006.01) |
| *G02B 27/00* | (2006.01) |
| *H04N 13/00* | (2018.01) |

(52) U.S. Cl.
CPC ....... *H04N 13/117* (2018.05); *G02B 27/0093* (2013.01); *G02B 27/017* (2013.01); *G06F 3/012* (2013.01); *G11B 27/031* (2013.01); *H04N 13/189* (2018.05); *H04N 13/356* (2018.05); *H04N 13/383* (2018.05); *H04N 2013/0088* (2013.01)

(58) Field of Classification Search
CPC .. H04N 13/117; H04N 13/189; H04N 13/383; H04N 13/356; G11B 27/031
See application file for complete search history.

(56) References Cited

U.S. PATENT DOCUMENTS

| | | | | |
|---|---|---|---|---|
| 2008/0130408 A1* | 6/2008 | Pfaffinger | ................. | H04S 7/00 367/13 |
| 2013/0063432 A1* | 3/2013 | Kaps | ....................... | G06T 13/40 345/419 |
| 2014/0317028 A1* | 10/2014 | Turgeman | ................ | G06N 5/04 706/11 |
| 2017/0039881 A1* | 2/2017 | Belch | ................. | G09B 19/0038 |
| 2017/0358139 A1* | 12/2017 | Balan | ................. | G02B 27/0172 |
| 2018/0035101 A1* | 2/2018 | Osterhout | ............ | G02B 27/017 |
| 2018/0075653 A1* | 3/2018 | Schillings | ............. | G06T 19/006 |

\* cited by examiner

Primary Examiner — Mishawn N. Hunter
(74) Attorney, Agent, or Firm — Crowe & Dunlevy; Terry L. Watt

(57) ABSTRACT

According to an embodiment, there is provided a system and method for generating a 3 axis perspective view data set in a 360° VR video editing system. One embodiment involves the monitoring of both the view position of a VR headset and the interaction activities of controller devices interacting with the editing software and afterwards automatically utilizing the gathered data to automatically generate output video works in 360° format and 2D format.

23 Claims, 3 Drawing Sheets

SYSTEM AND METHOD FOR REALTIME 360 DEGREE VIDEO PERSPECTIVE VIEW PATH DETERMINATION

CROSS REFERENCE TO RELATED APPLICATIONS

This application claims the benefit of U.S. Provisional Patent Application Ser. No. 62/426,064 filed on Nov. 23, 2016, and incorporates said provisional application by reference into this document as if fully set out at this point.

TECHNICAL FIELD

This disclosure relates generally to methods of editing video content and, in more particular, to methods of real time editing and determination of a viewing path for 360° video source material with utilization of a smart phone or VR-headset.

BACKGROUND

This disclosure relates generally to methods of providing video editing functionality for use with 360° video source material. Access to 360° video material is becoming increasing common due to the more ready availability of compact 360° video cameras, i.e., cameras that can record video in a 360° arc about the camera. The newer user-oriented cameras are suitable for handheld filming, mounting on a drone, etc. When viewed via a proper viewing device such as, for example, a virtual reality ("VR") headset, a 360°/virtual playback places the viewer inside of the video, inside a sphere displaying the 360° environment and makes it possible for the viewer to look around within a virtual environment which contributes to an immersive viewing experience.

Software for editing 2D video material is readily available and allows even the most inexperienced users to perform sophisticated edits on that sort of material. However, editing 360° video source material is a completely different prospect. For example, each second of 360° source material contains an immense amount of video for every second of the source material as compared with a conventional 2D video source. Further, such 360° video recordings cannot readily be displayed on a 2D computer monitor of the sort used by conventional video editing software. Thus, the ability to edit 360° video is substantially limited by conventional video editing hardware and software.

Thus, what is needed is a system and method of editing 360° video that allows the user to easily view and manipulate the 360° source material, a system and method that provides an intuitive utilization of the devices available for handling 360° source material.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment, there is provided a system and method for editing 360° video source material using viewing path recording and acquired in real-time as the video is played for the user. One embodiment utilizes an active VR headset as a controller/data source in order to implement the system of editing 360° video material disclosed herein. In this embodiment, by simply viewing the 360° source material editing can be performed.

In various embodiments the ability to view the 360° video material is integrated into the video editing process to allow for an intuitive, quick and exact approach into the editing process.

The foregoing has outlined in broad terms some of the more important features of the invention discloses herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION

Figure 1:
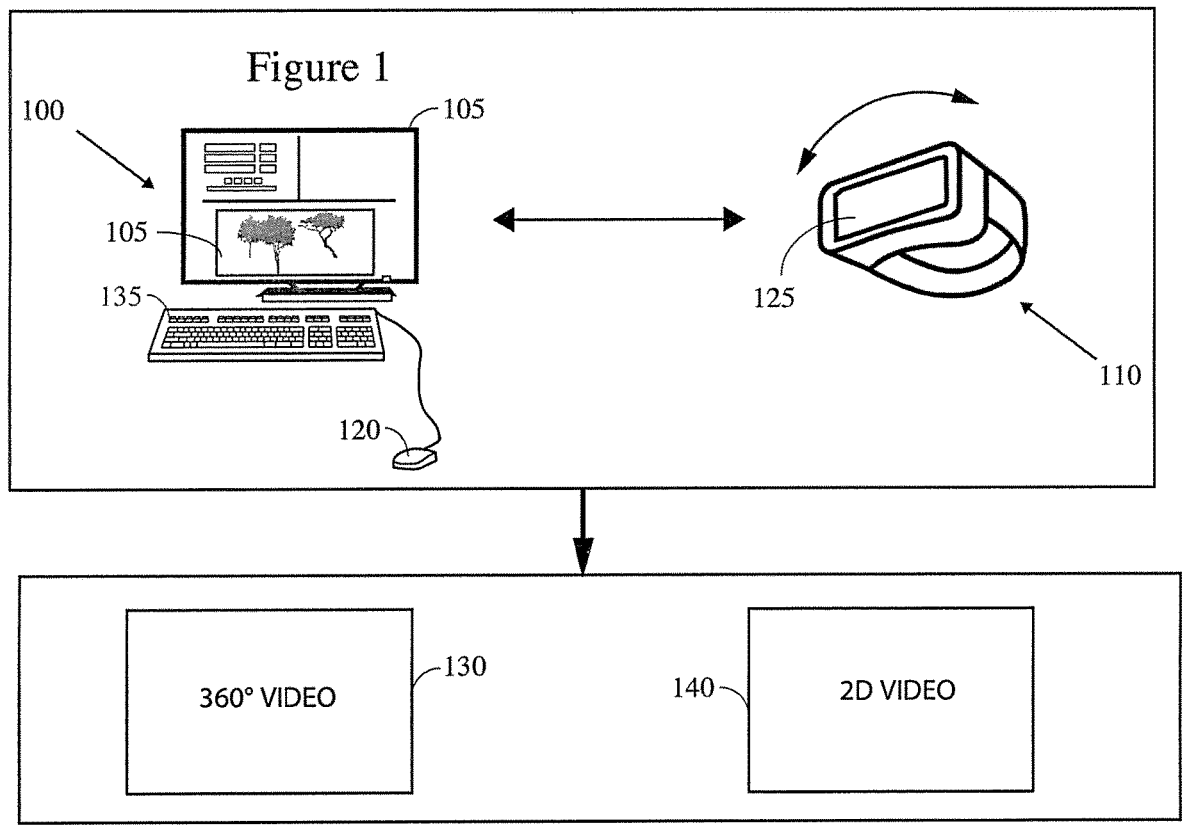
FIG. 1 is an illustration of the working environment of the instant invention.

While this invention is susceptible of embodiments in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Turning first to the embodiment of FIG. 1, a personal computer 100 (e.g., a desktop computer) is used. At least a portion of the instant invention will be implemented in the form of software running on that computer 100. Such a computer will have some amount of program memory and hard disc storage (whether internal or accessible via a network) or other storage (e.g., SSD) as is conventionally utilized by such units. This embodiment of the work station of the instant invention consists of a personal computer 100 and a VR display headset 110 that has an associated display device 125 which might be integral to the VR headset 110 or it could be a smart phone that is placed within a holder in the headset 110 provided for that purpose. Either way, the VR headset 110 will be connected to the computer 100 via a wire or wirelessly. According to this example, if a smart phone is used as the VR display device 125 it would typically be connected wirelessly to the computer 100. Desktop video editing software of the sort described hereinafter is running on the computer 100 and is able to load video source material, e.g. a VR 360° video provided by a user. In this embodiment, a special VR viewer app will be running in the VR display device 110 and/or on the smart phone that is used as a display 125, allowing the user to a full 360° view of the video work by using the headset and orienting the headset 110 in any desired direction as is conventionally done.

The application running within the VR viewer 110 of FIG. 1 will be synchronized with software running on the computer 100, i.e., the app will be in communication with video editing software running on the computer 100 on which editing is being performed. The app will preferably also control or be synchronized with the display of the 360° video source material on the video monitor 105 of the computer 100. In some cases, a section 105 of the graphical user interface of the video editing software running on the personal computer 100 will display the current portion of the 360° video that is currently being viewed by the user. By utilizing the VR viewer app, which functions as the priority device in terms of handling the 360° video source material, and the VR headset 110 the user will be able to initiate and control the editing of the 360° video source material in its entirety while wearing the headset and viewing the 360° video source material while editing.

During the time when the 360° video source material is being viewed and edited via the VR headset, which might be either connected wirelessly or wired to the personal computer, an embodiment will actively monitor and record the head movements of the viewer via head tracking. This is accomplished depending on the desired output video framerate, preferably and for example for every frame one head tracking position. [The 360° video source material might consist of a continuous 360° recording of an event, however it might also consist of individual video sequences containing different 360° recordings. After the playback has ended or was stopped by the user, a data set that represents a 3-axis perspective view path will be generated. This data set contains the stored orientation data of all three axis of the VR headset as generated by the head movements of the user during the active playback process. In some cases the three axis data will be used to recover the six degree of freedom of the user's motion including forward/backward motion, side to side motion, and rotation left to right motion.

The generated data set can then be used in cases like object tracking, as a specific example. That is, the input material might contain 360° material recorded during a diving, or a skydiving session where it is desired to follow a specific object in the input material as it moves (e.g., an automobile as it drives past the 360° video camera). Note that keeping the viewpoint of the video centered on this sort of moving object in a 360° video would be difficult to do using conventional video editing software.

In one embodiment the data set collected while the user was viewing the video can then be utilized to automatically generate an edited 360° video work containing the three-axis perspective view path created by the user during the viewing. The edited 360° video work will typically contain some or all of the continuously played source material edited to follow the viewpoint of the user. However, additional material may be inserted (including static images) that stay on screen for some specified period of time. This might be particularly useful when the input material consists of multiple sequences of different 360° video material and when the user is intentionally looking at different directions from the input 360° video material. Additionally, certain embodiments will also automatically generate a 2D output video work which is based on the perspective view path generated by the user.

Further, the computer 100 could have some number of peripheral devices attached physically or electronically to it, for example a keyboard 135 and a mouse 120 are commonly found on desktop computers. In some cases the peripheral devices will be monitored for input from the user, with such input being combined with the motion data to provide a comprehensive data set that contains the 3 axis perspective view path together with the input from the peripherals. The combined data set is then used to generate the output 360° video work 130 and/or the 2D output video work 140. For example, user input via a mouse wheel could be interpreted by the monitoring software as a zoom in or a zoom out interaction, with this command being implemented in the output video work at the time selected by the user.

Figure 2:
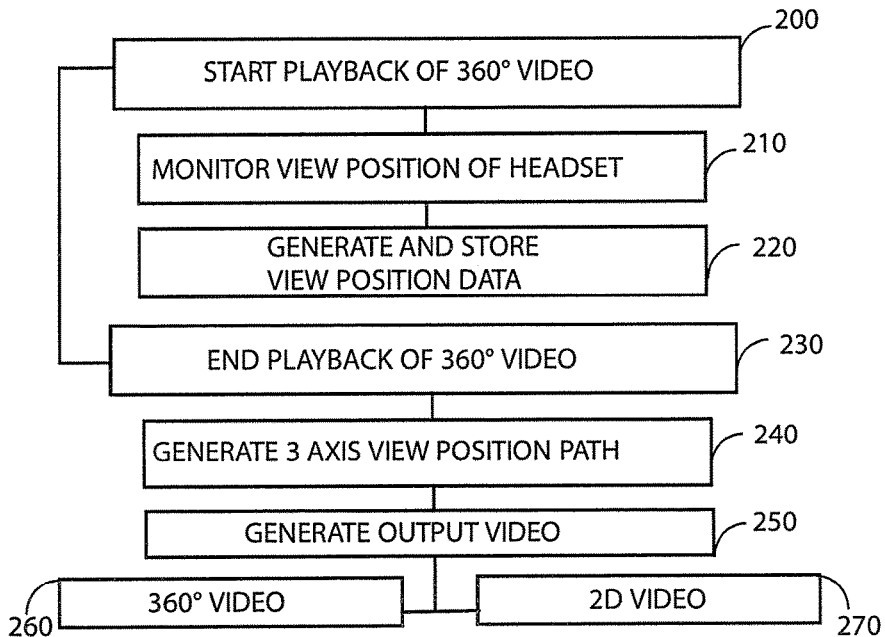
FIG. 2 is illustrating the workflow of one preferred embodiment of the instant invention.

Turning next to FIG. 2, this figure illustrates a workflow associated with one embodiment. In a first preferred step 200 the user will initiate the playback of the source 360° video while wearing a headset that is connected wirelessly or by wire to the personal computer. Note that the term "playback" as used herein should be understood to include cases where the source video is displayed on the monitor 105 of the originating computer while it is being transmitted to and viewed within the VR headset 100. It should also be understood to be applicable to instances where the video source is transmitted, streamed, or otherwise delivered to the VR headset 110 without being simultaneously displayed on the computer monitor 105. That being said, simultaneous display would generally be preferred.

The instant invention will, in a next preferred step 210, continuously monitor the view position/orientation of the headset which will generate a data set 220 that can be then stored during or after the playback of the 360° video work has ended 230. The instant invention will then utilize the resulting orientation data set to generate a 3 axis view position path 240 for the selected 360° video work. This 3 axis view position path is then used to generate a desired output video 250, which could be either a 360° video 260 or a 2D video 270 or both, depending on the user preferences.

Further, a number of different devices that are able to record 360° video material and also generate metadata during the recording process, wherein some of this metadata is being used as a starting point for stabilizing the recorded 360° video material. The instant invention in another preferred embodiment might utilize this metadata in addition to the generated temporally straightened 3 axis orientation data set as starting point for the generation of the 360° output video that is also automatically stabilized.

Additionally, in another preferred embodiment instead of passively viewing the 360° video work the user will be able to manually define his or her preferred focal viewing point within the 360° video and instruct the associated software invention to not respond to VR headset motion data. In some embodiments, this command might involve having the point-of-view move, e.g., between two defined focal viewing points. This command could be used to generate a transition between the two different viewing points within the therewith defined two consecutive sections of the source 360° video material. Such an embodiment would be particularly useful when the input material also consists of static images or of different 360° video recordings.

When generating the 360° output video, in some embodiments the instant invention will utilize the entire data set to produce an output 360° video that tracks the center of the field of view that the user chose while watching the 360° source video work. In case of generating a 2D output video, this embodiment only uses the position data from the 3 axis view position path that is necessary to generate such an output 2D video. In some embodiments, abrupt changes in the data set view point will be smoothed by incorporating transitions between, during, or before the changes. To determine which of the recorded view position changes are meaningful the instant invention uses in some embodiments a weighting system, wherein orientation changes that are above a specified percentage (e.g., an angular threshold) in relation to the time associated with the change are regarded as position changes that should be incorporated when producing the output video work. This will also tend to reduce the jitter that would otherwise likely be present in the output video.

Figure 3:
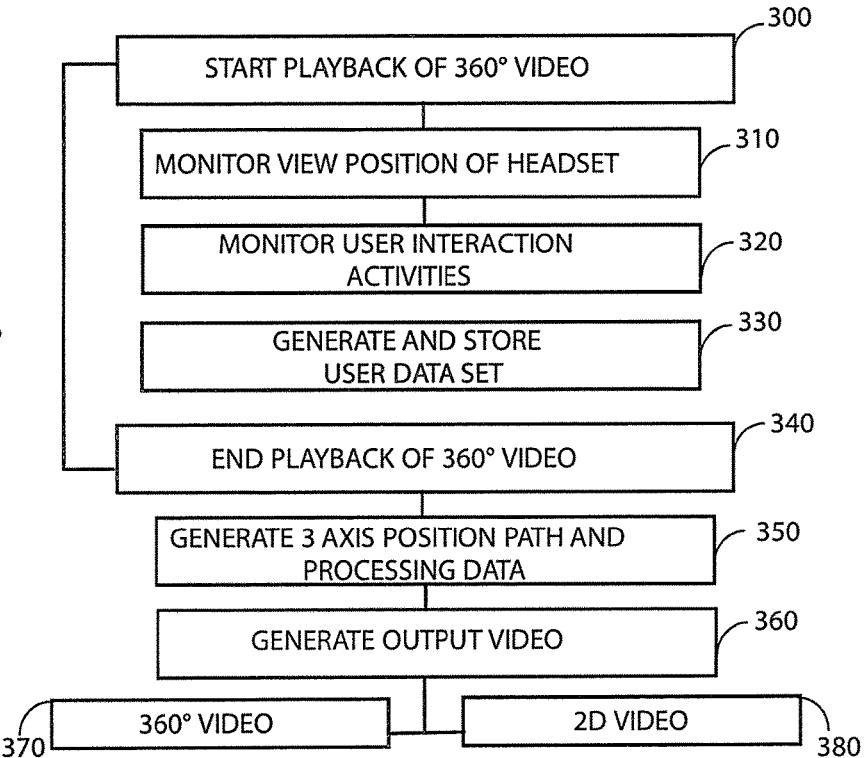
FIG. 3 illustrates the workflow of another preferred embodiment of the instant invention.

Turning now to FIG. 3, this figure contains an operating logic suitable with some embodiments. In a first preferred step 300 the user will initiate the playback of the source 360° video work, wearing the headset, connected wirelessly or by wire to the personal computer. The instant invention will in a next preferred step 310 continuously monitor the view position of the headset. Additionally, interactions with the editing software (e.g., via keyboard or mouse) will also be monitored and captured. Those interaction commands, if any, will be combined with the viewpoint data 320 to generate a user data set 330 which can then be stored after the playback of the 360° video work is ended 340. This embodiment then utilizes the data set to generate a 3 axis view position path and processing data 350 for the selected 360° video work. The generated data can then be used to generate an output video 360, which is either a 360° video 370 or a 2D video 380 or both, depending on the user preferences.

In the case of embodiments that include the output of a 2D video, one approach to creating same would be to create a video that based on the user's field of view of the 360° work as that view changed over time. Another approach would be to select 2 of the 3 axis data values (e.g., the "X" and "Y" axes) from the recorded data set and use the information to form the output 2D video work. In some embodiments, the two coordinates will be used to create the 2D video by extracting a series of video frames from the 360° video that are centered on the selected coordinates. Those of ordinary skill in the art will readily be able to devise alternative ways to create the 2D video from the motion data set.

When generating the 360° output video work the instant invention will typically use the entire data set of 3 axis orientation path and the interaction data to therewith produce an output video that resembles the point of view that the user chose while watching the 360° source video work, optionally with added zoom in/out commands, cut commands, transitions, etc., of the sort that a user might issue in order to perform some basic edits of the output video. In case where the user chooses to generate a 2D output video, this embodiment only need to utilize the position data from the 3 axis view position path in order to extract the 2D video that represents the portion of the 360° video actually within the field of view of the user. As described previously, in interpreting the orientation data it might be necessary to smooth abrupt changes in the data set by filtering the motion series and/or incorporating transitions between at or before the changes—the data gathered by user peripheral interactions will preferably be fully integrated into the output video work, whether it is 2D or 360° video.

In another embodiment the data set of the 3 axis orientation path will not be utilized in a destructive manner by the instant invention. That is, the input 360° video work will not be edited, instead time values and the 3 axis orientation path will be transmitted along with the source 360° video to software that will handle the playback of the video. Then the motion data and the associated interactions will be applied to the source video as it is played for the user so that the user sees the video as intended by the editor. As such, the replay software will utilize the corrected data during a playback of the source 360° video to produce the performance of an edited 360° edited video and/or a or edited 2D video work depending on the choice of the user without destructively editing the source.

It should be noted that "user interactions" 320 as that term is used herein can refer to manipulations of the peripheral devices connected to the personal computer. These sorts of interactions can be used to signal, for example, the location of cuts (or zooms, transition starts/ends, etc.) that are to be formed in the output work. The peripheral devices might also be used to start and stop the video, increase or decrease the volume, etc. However, an additional source of interaction data might be voice detection and recognition, where the user communicates his or her editing commands by voice commands.

Even further, the interaction options might allow the user to select individual frames from the source video that can then be extracted and used as screenshots or individual digital images. The user might be able to select marker positions while watching the source video and have those marker positions used to extract individual images at the time and position/orientation indicated by the user. Those markers might also serve as position reminders for the user (e.g., where additional editing needs to be done). During playback, data (e.g., the time of occurrence within the source video, orientation, etc.) associated with certain types of markers might be displayed to the user on-screen to assist in the editing process. Additionally, the markers might be displayed in a timeline display.

Figure 4:
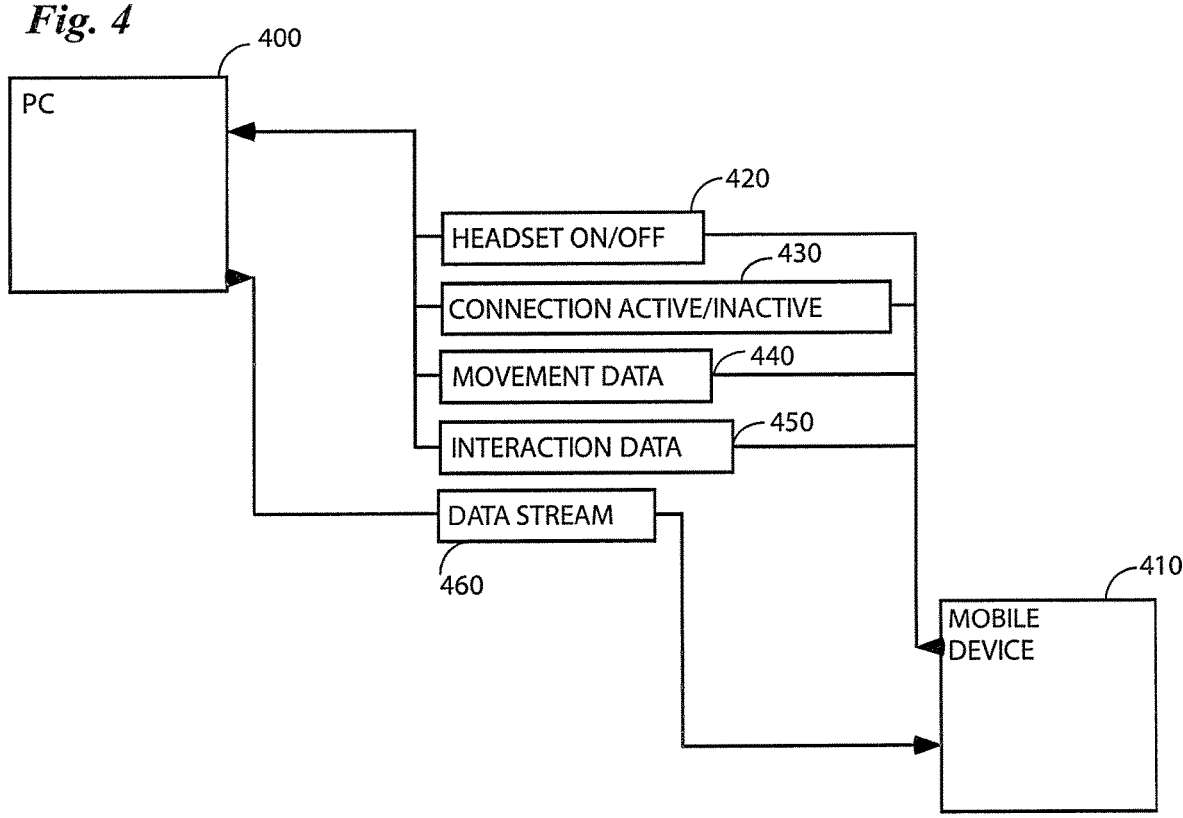
FIG. 4 depicts the data streams between the participating devices of the instant invention.

Turning next to FIG. 4, this figure contains some examples of the different data types and data stream connections between the participating devices of the instant invention that might be used. Generally, as described previously various embodiments will be implemented on a personal computer 400 which will store and potentially run the video editing software that is used to generate the output video work. In some embodiments, the VR headset that is worn will utilize a mobile computing device (e.g., a smart phone or other device with an accelerometer, gyroscope, inclinometer, etc.) to display the video to the user. That same device (or similar functionality built into the VR headset) will be used to sense the motion data 440 that is used during the editing process. In one embodiment the personal computer will store the 360° source video and stream it 460 on request to the headset's mobile computing device, which might be connected wirelessly or by wire to the personal computer.

Embodiments of the instant invention gather a plurality of different data values from the VR headset during the playback of the 360° source video. In one embodiment the instant invention will constantly monitor the status, including the orientation, of the headset 420 and also the connection status between the participating peripheral devices 430. If the head set is being utilized as determined by utilizing head orientation tracking technologies, the connection status could also be determined by monitoring the quality of the transfer of the data stream. In addition to the status information the instant invention continuously monitors the movement data 440 and the interaction data 450 of the mobile device and the user.

For purposes of the instant disclosure, the terms "movement data" 440 or "motion data" will be used to indicate measurements collected by the VR headset (or its attached mobile computing device) that reflect the movement of the VR headset during a user's viewing of the 360° source video, e.g., data such as the orientation, acceleration/deceleration, movement direction and/or rate, etc., might be collected.

The term "interaction data" 450 will be used to represent user commands—as distinct from movement data—that are issued during replay of the source video work. Note that some movement data could also serve as interaction data if such has been specifically defined by the tracking software. For example, a rapid head shake or nod could be a signal to start or stop the playback of the source video. Obviously, any editing command could potentially be triggered in this way if that were desired. More generally, interaction data will be used, for example, to define cut positions, zoom in, or zoom out, start or stop the playback of the video, set starting/ending positions of windows in the video work, etc. In the event that the user does not want to process the entire source video in one session, a section definition (e.g., a marker in the video timeline) could be utilized to indicate a stopping position of the current viewing/editing process, which allows the user to pick up the process at the defined position at a later time.

In an alternative embodiment, the 360° source video work might be stored on the mobile device that serves as the video display for the VR headset. In this embodiment the instant invention could be implemented on the mobile device by monitoring the movement data 440 and interaction data 450 and storing the collected data set on the mobile device. This data set could then be transferred to a personal computer where the data set is applied to the 360° source video to generate the 360° output video work or the 2D output video work.

Figure 5:
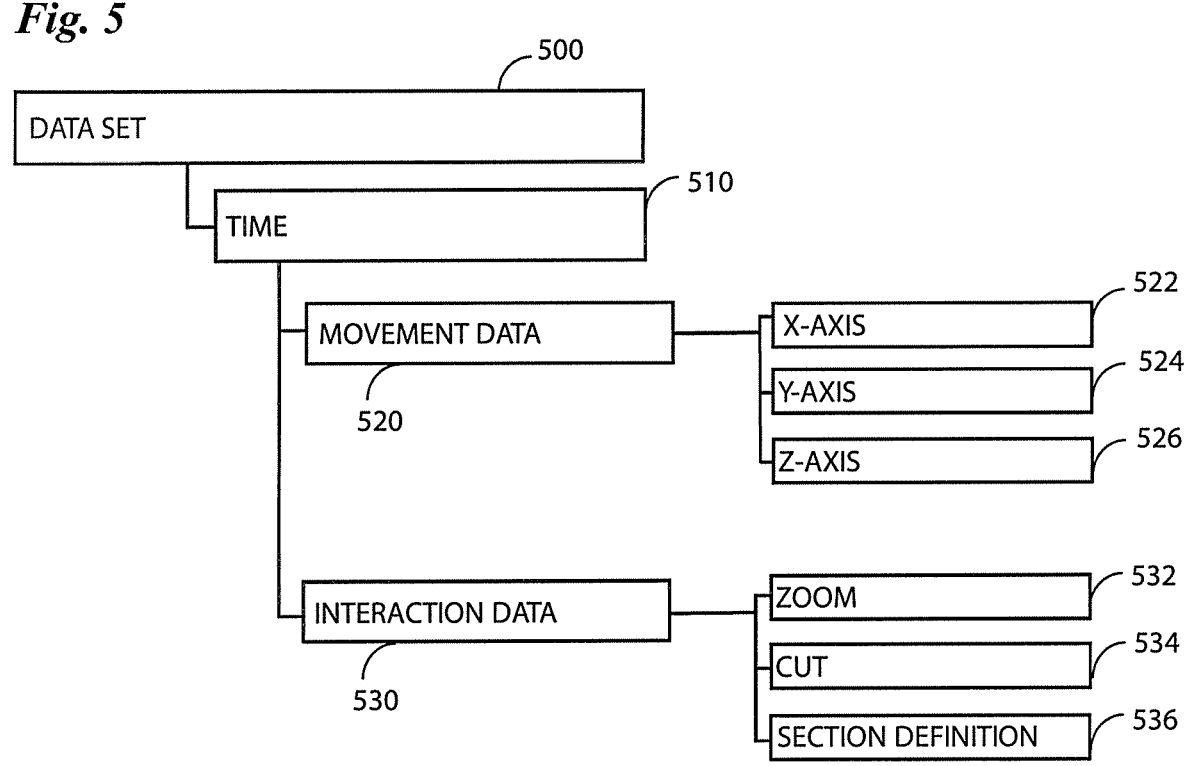
FIG. 5 illustrates the contents of the data set generated and utilized by the instant invention.

Now turning to FIG. 5, this figure depicts the contents of one embodiment of the data set 500 generated and utilized by the instant invention. The time data 510 represents the run time of the 360° source video work and is used to correlate movement and interaction data with the position of the playback head. During the viewing process the instant invention will gather the movement data 520 of the user wearing the headset and viewing the video work and send it (or save it locally), along with the time of occurrence of each movement/interaction so that it can be correlated with the source video. As described previously, various embodiments track (for every time increment) and store data for the different axis, x-axis 522, y-axis 524 and z-axis 526 of the accelerometer and/or inclinometer, gyroscope, etc. The applicability of the stored data stream is then later evaluated and potentially screened in some embodiments depending on the intensity of changes in the movement data in relation to the time frame of these changes. Another other data attribute that the instant invention also will monitor is the interaction data 530 through which, if available, interaction activities of the user are monitored. As described previously, preferably the user will be able to use interaction devices either connected to the mobile device or the personal computer, for example mouse and keyboard, to issue editing commands. The user will, for example, be able to define zooms (in or out) 532, cuts 534, starting/ending window locations in the video timeline 536, markers in the timeline, etc.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an addition" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of performing a video work, comprising the steps of: (a) accessing a 360° source video using a computer; (b) establishing a connection between a VR headset and said computer; (c) initiating a playback of said 360° source video on said computer; (d) transmitting said playback of said 360° source video to said VR headset; (e) displaying said transmitted playback of said 360° source video to a user wearing said VR headset; (f) recording a plurality of head movements of the user wearing the VR headset while said playback of said 360° source material is displayed, thereby recording a series of motion data values and associated time values corresponding to the recorded head movements of the user, each of said motion data values having an associated time value; (g) receiving within the computer said recorded series of motion data values and said associated time values; (h) generating a 3 axis position path data set from said received recorded series of motion data values and said associated time values; (i) storing said 3 axis position path data set; (j) in the computer, applying said 3 axis position path data set to the 360° source video, thereby creating an edited 360° video work from said 360° source video; and (k) storing said edited 360° video work; and, (01(k) performing at least a portion of said stored edited 360° video work for the user.

2. The method of performing a video work according to claim 1, wherein step (e) comprises the step of displaying to a user wearing said VR headset said playback of said transmitted 360° source video using a video display integral to said VR headset.

3. The method of performing a video work according to claim 1, wherein step (e) comprises the step of displaying to a user wearing said VR headset said playback of said transmitted 360° source video using a video display removably attached to said VR headset.

4. The method of performing a video work according to claim 3, wherein said video display comprises a smart phone.

5. The method of performing a video work according to claim 1, wherein step (j) comprises applying said 3 axis position path data set to the 360° source video, thereby creating an edited 3D video work and an edited 2D video work.

6. The method of performing a video work according to claim 5, wherein creating an edited 2D video work comprises selecting 2 of the 3 axis data values of the 3 axis position path data set to thereby create an edited 2D video work.

7. The method of performing a video work according to claim 1, wherein step (k) comprises the step of initiating a video editing software to apply said 3 axis position path data set to the 360° source video, thereby creating an edited 360° video work.

8. The method of performing a video work according to claim 7, wherein step (m) also comprises of applying said editing data set to the 360° source video, thereby creating an edited 2D video work.

9. The method of performing a video work according to claim 8, wherein creating an edited 2D video work comprises of selecting 2 of the 3 axis data values of the editing data set to thereby create an edited 2D video work.

10. A method of performing a video work, comprising the steps of: (a) accessing a 360° source video using a computer; (b) establishing an electronic connection between a VR headset and said computer; (c) initiating a playback of said 360° source video on said computer; (d) using said electronic connection to transmit said playback of said 360° source video to said VR headset; (e) using said VR headset to display said transmitted playback of said 360° source video to a user wearing said VR headset; (f) recording a plurality of head movement data values of the user wearing the VR headset while said transmitted playback of said 360° source video is displayed, thereby recording a plurality of motion data values and a matching plurality of associated time values corresponding to the recorded head movement data values of the user, each of said motion data values having an associated time value: (g) transmitting to said computer said plurality of motion data values and said associated plurality of time values; (h) recording a plurality of interaction commands while said transmitted playback of said 360 source video is displayed, each of said plurality of interaction commands having an associated command time value; (i) receiving within said computer said plurality of interaction commands and said associated plurality of interaction command time values; (j) ending the playback of said 360° source video on said computer; (k) generating an editing data set from said received plurality of motion data values and said associated time values and said plurality of interaction commands values and said associated plurality of interaction command time values; (l) storing said user editing data set; (m) applying said user editing data set to the 360° source video, thereby creating an edited 360° video; and (n) performing at least a part of said edited 360° video for the user.

11. The method of performing a video work according to claim 8, wherein step (e) comprises the step of displaying said playback of said transmitted 360° source video to a user wearing said VR headset using a video display integral to said VR headset.

12. The method of performing a video work according to claim 10, wherein step (e) comprises the step of displaying said playback of said transmitted 360° source video to a user wearing said VR headset using a video display removably attached to said VR headset.

13. The method of performing a video work according to claim 12, wherein said video display comprises a smart phone.

14. The method of performing a video work according to claim 10, wherein step (m) comprises the step of initiating a video editing software to thereby apply said editing data set to the 360° source video, thereby creating an edited 360° video work.

15. A method of performing a video work, comprising the steps of: (a) initiating a playback of a 360° source video on a VR headset display worn by a user; (b) using said VR headset to record a plurality of head movements of the user while said playback of said 360° source video is displayed, thereby recording a plurality of motion data values and associated time values, each of said plurality of motion data values having an associated time value; (c) recording at least one interaction activity of the user while said playback of said 360° source video is displayed, thereby recording at least one interaction activity data value and at least one associated interaction time value corresponding to the recorded head movements of the user, each of said at least one interaction activity data values having an associated interaction time value; (d) transmitting said plurality of motion data values, said associated plurality of time values, said at least one interaction data value, and said at least one associated interaction time value to an editing computer; (e) storing on said editing computer said transmitted plurality of motion data values, said associated plurality of time values, said at least one interaction data value, and said at least one associated interaction time value; (f) on said editing computer using said transmitted plurality of motion data values, said associated plurality of time values, said at least one interaction data value, and said at least one associated interaction time value to the edit the 360° source video, thereby creating an edited 360° video work; and (g) performing at least a part of said edited 360° video work for the user.

16. The method of performing a video work according to claim 15, wherein said VR headset display is a smart phone.

17. The method of performing a video work according to claim 15, wherein said VR headset display has at least one of an accelerometer, a gyroscope, and an inclinometer.

18. The method of performing a video work according to claim 17, wherein said VR headset display is a smart phone.

19. The method of performing a video work according to claim 15, further comprising the step of
  (h) on said editing computer using said transmitted plurality of motion data values, said associated plurality of time values, said at least one interaction data value, and said at least one associated interaction time value to edit the 360° source video, thereby creating an edited 2D video work.

20. The method of performing a video work according to claim 19, wherein said plurality of transmitted motion data values comprise a plurality of 3 axis data motion values, and wherein step (h) comprises the step of using 2 axes of each of said plurality of 3 axis motion data values, said associated plurality of time values, said at least one interaction data value, and said at least one associated interaction time value to edit the 360° source video, thereby creating an edited 2D video work.

21. A method of performing a video work, comprising the steps of: (a) initiating a playback of a 360° source video on a display of a mobile computing device removably attached to a VR headset; (b) using said mobile computing device to display said 360° source video to a user wearing said VR headset; (c) recording head movement data of the user wearing the VR headset while said playback of said 360° source video is displayed, thereby recording a plurality of motion data values and associated time values corresponding to the recorded head movement data, each of said plurality of motion data values having an associated time value; (d) generating a 3 axis position path data set from said recorded plurality of motion data values and said associated time values; (e) transmitting said 3 axis position path data set and said 360° source video material to a computer; (f) on said computer applying said 3 axis position path data set to the 360° source video material, thereby creating an edited 360° video work; and (g) performing at least a part of said edited 360° video work for the user.

22. The method of performing a video work according to claim 21, further comprising the step of:
  (h) applying said 3 axis position path data set to the 360° source video, thereby creating an edited 2D video work.

23. The method of performing a video work according to claim 22, wherein the step of creating said edited 2D video work comprises the step of using 2 axes of the 3 axis data values of the 3 axis position path data set to create an edited 2D video work.

* * * * *